July 7, 1970  R V. MERTZ  3,518,840
METHOD OF AND APPARATUS FOR CONNECTING A PIPELINE
ACROSS AN OBSTRUCTION
Filed March 27, 1968  2 Sheets-Sheet 1

R. VALENTINE MERTZ
INVENTOR.

BY
Browning, Hyer, Eckensecht + Thompson

ATTORNEYS

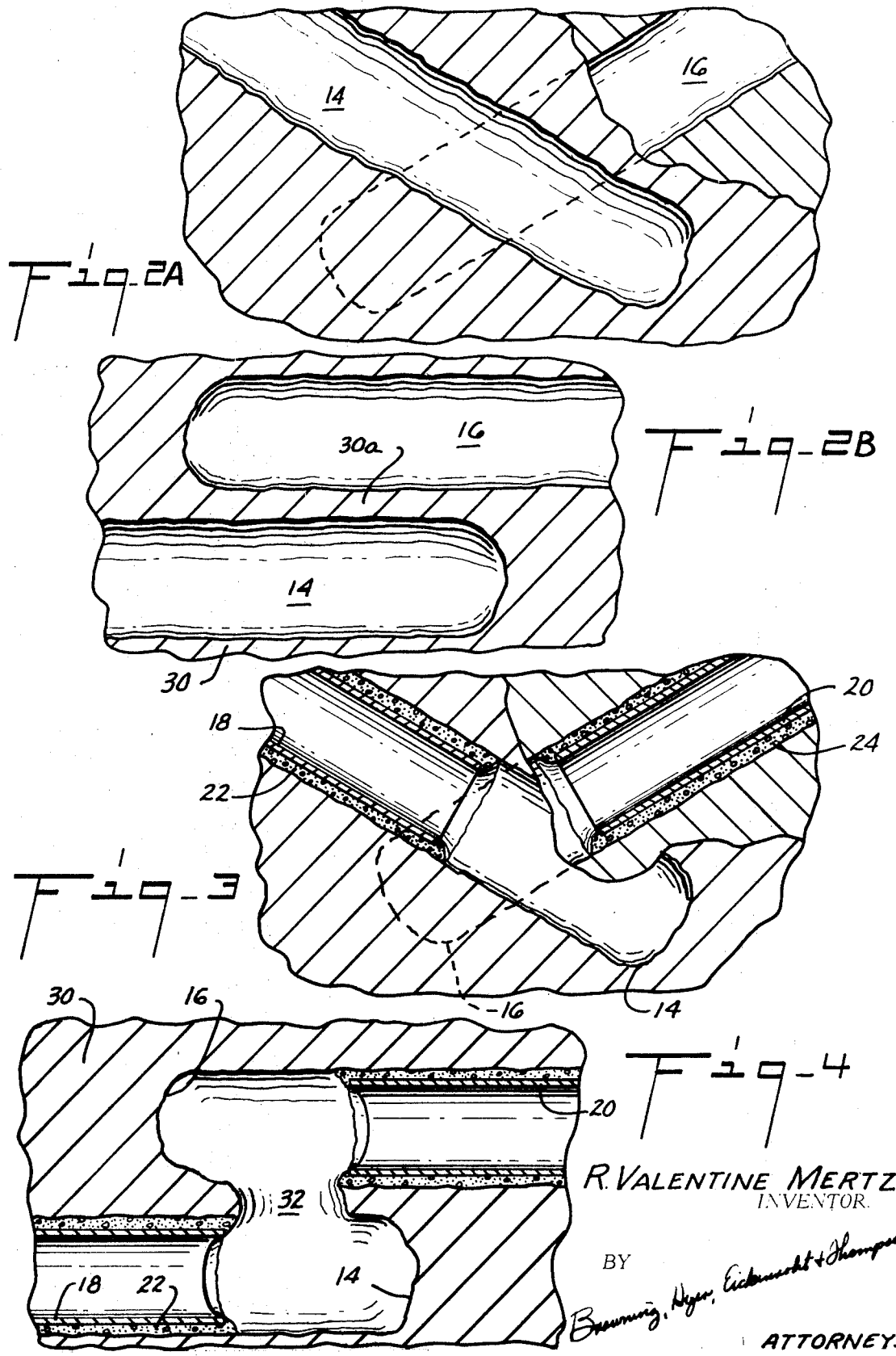

United States Patent Office 3,518,840
Patented July 7, 1970

3,518,840
METHOD OF AND APPARATUS FOR CONNECTING A PIPELINE ACROSS AN OBSTRUCTION
R Valentine Mertz, Houston, Tex., assignor to Trunkline Gas Company, Houston, Tex.
Filed Mar. 27, 1968, Ser. No. 716,462
Int. Cl. F16l *1/00;* E02g *3/00*
U.S. Cl. 61—72.1                    7 Claims

ABSTRACT OF THE DISCLOSURE

Two well bores are drilled from opposite sides of an obstruction, such as a river. The well bores are inclined from the vertical such that they will intersect or pass close to each other at a preselected depth below the obstruction. The preselected depth is such that the overburden equals or exceeds the operating pressure of the pipeline. A string of casing is cemented in each well bore and communication is established between the well bores below the casing strings, if the well bores did not intersect when drilled. The casing strings are then connected into the pipeline sections on each side of the obstruction to permit fluid to flow from one section of the pipeline to the other through the casing strings.

---

This invention relates to a method of and apparatus for connecting a pipeline across an obstruction, such as a river.

This invention has utility for by-passing any obstruction in the path of a pipeline; however, it is particularly useful for connecting a pipeline across a river particularly a navigable one, such as the Mississippi.

Constructing a pipeline across a large navigable river is expensive. The work must be carried on so that it does not interfere with normal river traffic. This requires a careful scheduling of the work and even then delays are difficult to avoid. Also, most navigable rivers have levees that parallel its banks on each side. Such levees are constructed for flood control purposes and are under the jurisdiction of the U.S. Corps of Engineers, who will not allow these levees to be cut, even temporarily. This means that the pipeline must pass over the top of the levees, which further increases the cost of river crossings.

It is an object of this invention to provide a method of and apparatus for connecting a pipeline across an obstruction, such as a river, that will allow the pipeline to be so connected without interfering with the normal use of the obstruction.

It is another object of this invention to provide a method of and apparatus for connecting a pipeline across an obstruction which method can be practiced and the apparatus installed from locations on opposite sides of the obstruction, e.g., on the sides of the levees away from the river.

It is yet another object of this invention to provide a method of and apparatus for connecting a pipeline across a river which method can be performed and the apparatus installed without having to bridge across the river levees or dig a trench in the river bottom to receive the pipe.

Another object of the invention is to provide a method of and apparatus for connecting a pipeline across a river without having to lay the pipeline either on the bottom of the river or in a ditch dug in the river bottom, thereby eliminating the ever present danger of the pipeline creating a hazard to navigation because of a leak, because the anchor of some ship caught the pipeline, or because the flowing water eroded away the river bank or the bottom sediments sufficiently to expose the pipeline.

It is still a further object of this invention to provide a method of and apparatus for connecting a pipeline across a river through inclined bore holes drilled from opposite sides of the river, which bore holes are lined with strings of well casing and which are connected together below the casing far enough below the ground for the overburden to equal or exceed the operating pressure of the pipeline.

These and other objects, advantages, and features of this invention will be apparent to those skilled in the art from a consideration of this specification, including the attached drawings and appended claims.

The preferred method and apparatus for practicing this invention will be described in detail in connection with the attached drawings, in which, FIG. 1 is a cross sectional view of a river and a portion of the ground beneath it with a pipeline connected across the river in accordance with this invention;

FIGS. 2A and 2B are side and top views respectively on an enlarged scale of the two well bores drilled from opposite sides of the river in FIG. 1;

FIG. 3 is a side view of the well bores of FIGS. 2A and 2B after a string of casing has been cemented in each well bore;

FIG. 4 is a top view of the well bores of FIG. 3 after communication has been established between the two well bores.

Figure 1:
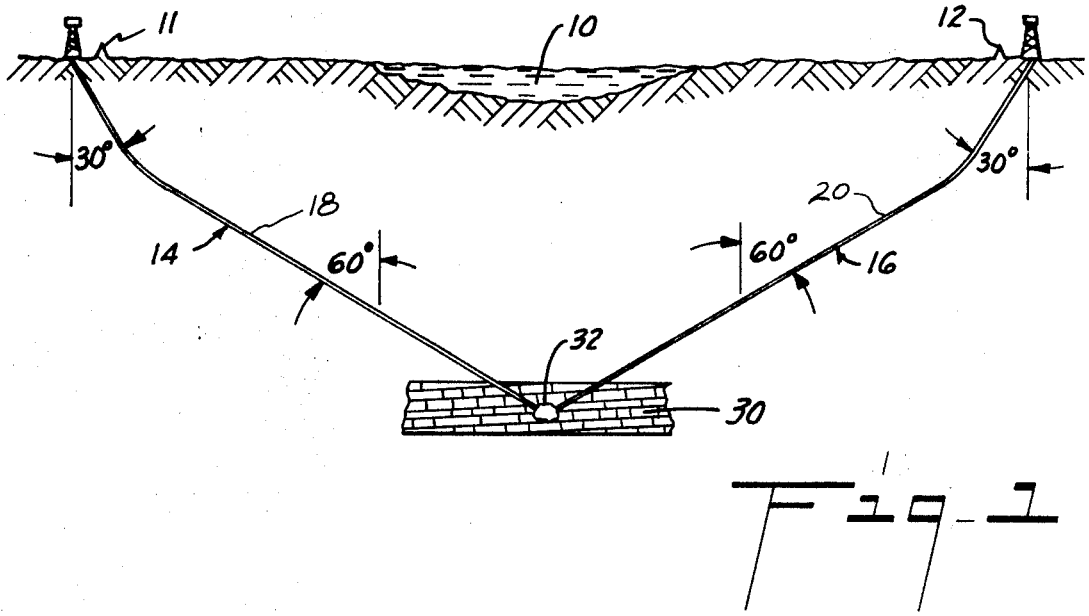

The invention will be described in detail with respect to a river crossing, since rivers are one of the most common obstructions encountered in pipeline construction. Assume that river 10 of FIG. 1 is one that would be expensive to build a pipeline across in the conventional manner for the reasons given above. Levees 11 and 12 have been built along each side of the river parallel to its banks for flood control purposes. The levees are set back from the normal river banks as shown, wherever this is possible. As stated above, most flood control levees are built and maintained by the U.S. Corps of Engineers and they will not let the levees be cut, even temporarily. Therefore, any pipeline that crossed the river heretofore had to come out of the ground, pass over the levee on one side, move back into the ground the desired depth below the river, and then come out of the ground again to clear the levee on the other side.

In accordance with this invention, first well bore 14 is drilled from the left hand side of the river, as viewed in FIG. 1, from a point on the outside of levee 11 away from the river. The well bore is inclined from the vertical so that it will pass below the mid point of river 10 at a preselected depth below the ground. Second well bore 16 is drilled from the other side of the river from a point on the side of the levee 12 away from river 10. It also is inclined from the vertical so that it passes below the mid point of river 10 at approximately the same preselected depth below the surface as did the first well bore. These well bores are drilled so that they either intersect or they pass very close to each other. The initial inclinations of the well bores are shown as being less than their final inclinations. This is the procedure usually followed in directional drilling. If the well bores end up too far away from each other, one can be plugged back far enough for it to be side tracked and re-drilled to cause it to either interesect the other well bore or to be close enough for communication to be established between the two well bores, in a manner to be described below.

Assume that holes or well bores 14 and 16 did not interesect, but passed close by each other, as shown in FIGS. 2A and 2B. After the well bores are drilled, casing strings 18 and 20 are run into bores 14 and 16, respectively. Each casing string is then cemented in the well bore in the conventional manner by pumping a cement slurry down the casing and back toward the surface through annular spaces 22 and 24 between the casing strings and the well bores. The cement slurry is followed with water or drilling mud to clear most of the casing of the cement slurry before it sets up. Conventional cementing equipment such as float shoes and collars and top and bottom cement plugs can be used for the cementing operation. Preferably, sufficient cement is used to fill annular spaces 22 and 24 with cement all the way to the surface.

After the cement has hardened, any that remains inside the casing strings is drilled out leaving the casing strings open and in communication with the well bores below their lower ends. The cement provides a seal between the well casing strings and the walls of the well bores which prevents fluid in the well bores below the casing from escaping to the surface through annular spaces 22 and 24. The cement also prevents surface fluids from running down the outside of the well casing and contaminating the fluid in the well bores below the casing strings.

After the casing is run and cemented in the well bores, the bores are connected below the casing. This step will not be required if the well bores intersect, when drilled, as there will then be a cavity in the formation in which they are located that is common to both well bores. Where, as shown, the bores do not intersect, communication can be stablished in any of several ways.

For example, in the drawings, the well bores missed each other leaving wall 30a of formation 30 between the well bores (FIG. 2B). After the well casing is set and cemented, pressure is built in one casing string until fluid starts to flow through wall 30a to the other well bore or until the pressure causes wall 30a to fail structurally. Actually, the wall could be destroyed by a combination of formation break down, due to fluid pressure, and structural failure. The failure of wall 30a does not have to be complete, for once fluid starts to flow through the wall from one well bore to the other, the formation will be eroded away in time leaving opening 32, through wall 30a, as shown in FIG. 4.

Figure 5:
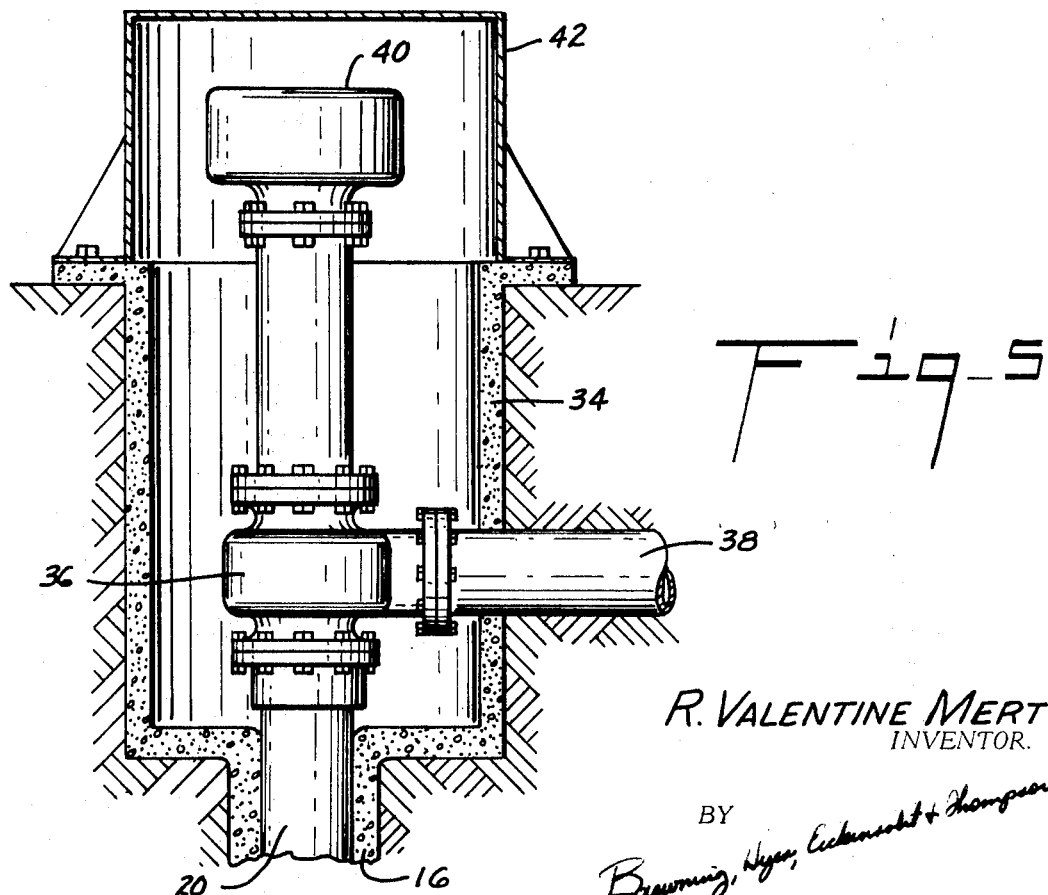
FIG. 5 is a view in elevation of one type of surface connection that can be used between one of the casing strings and the pipeline.

After communication is established between the well bores, the casing strings are connected to the pipeline sections on opposite sides of the river. FIG. 5 shows one arrangement for connecting the casing to the pipeline. Other arrangements can be used, if desired. As shown, well bore 16 extends from the bottom of cellar 34. After casing 20 is cemented in the well bore 16, preferably all the way to the bottom of cellar 34, the walls of the cellar can be lined with concrete as shown. This can be done earlier, if desired. Valve 36 is mounted on casing 20, at the depth that pipeline section 38 is to be below the ground and connected thereto. Valve operator 40 of valve 36 extends above the ground level and is supplied with whatever power it requires, probably electricity. Housing 42 encloses the valve operator and the top of cellar 34 to keep the cellar from filling up with rain water.

With the arrangement just described, the fluid carried by the pipeline, such as gas, will flow from well casing 18 to well casing 20 by way of cavity 32 in formation 30. This fluid will be under pressure. Therefore, cavity 32 is located far enough below the surface of the ground for the overburden to equal or exceed the pressure of the fluid within the cavity. The pressure gradient of overburden differs, but is approximately .65 p.s.i. per foot. It can be determined ahead of time for the locality of the crossing.

Therefore, before making a river crossing, such as the one shown in FIG. 1, a study should be made of the lithology of the area through electric logs, etc., of wells previously drilled in the area. Then a formation for cavity 32 can be selected that has the best characteristics. First, as stated above, it should be far enough under the ground to provide the necessary overburden. Next it should be of relatively low permeability. By having low permeability, it not only reduces the amount of fluid lost from the line into the formation, but also reduces the amount of formation water, which will find its way into cavity 32 from the formation. Probably, the preferred formations will consist of limestone, sandstone, or shale.

Should a formation having a sufficiently low permeability not be available, there are ways of sealing off cavity 32. For example, cement can be squeezed into the formation to reduce the permeability of the formation adjacent the lower ends of the well bores. Various plastices are also available, which can be squeezed into the formation for the same purpose.

One proposed river crossing of the Mississippi River has been designed, which will provide an example of what distances are contemplated in connection with the practice of this invention. Two well bores, as shown in FIG. 1, will intersect or pass by each other at approximately 3200 feet below the bed of the river. The distance between levees 11 and 12 at the point the river is to be crossed is approximately 9,000 feet. The wells will be started 500 feet on the side of the levees away from the river so that the well bores at the surface will be approximately 10,000 feet apart. Initially, the well will be inclined from the vertical about 30°. This inclination will be maintained for about 1,000 feet after which the inclination of the holes will be increased to about 60° to reach the desired formation under the river. After the holes are drilled, the pipeline will be connected across, or rather under the river, with the method and apparatus described above.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of constructing a pipeline around an obstruction, such as a river, comprising drilling a first well bore from one side of the obstruction into a formation below the obstruction far enough for the overburden to equal or exceed the pressure of the fluid in the pipeline, drilling a second well bore from the other side of the obstruction from the first to a position adjacent to the first well bore in the formation, positioning a casing string in each well bore to extend from a point adjacent to the end of the well bore to the surface, sealing between the outside of each casing string and the well bore in which it is located, connecting the well bores and connecting the well casing to the pipeline on each side of the obstruction to permit the fluid carried by the pipeline to flow down the well casing of one well bore and back to the pipeline through the other well casing.

2. The method of claim 1 in which the method includes the further step of reducing the permeability of the formation through which the well bores are connected.

3. The method of claim 1 in which the step of forming the seal between the outside of the well casing and the well bore includes the step of pumping cement between the well casing and the well bore.

4. The method of claim 3 in which the step of connecting the well bores includes the steps of increasing the fluid pressure in one casing string until fluid flow is established between the two well bores and continuing to cause the fluid to flow between the two well bores until the formation between the two bores is eroded away sufficiently for free communication to be established.

5. Apparatus for connecting two sections of a pipeline located on opposite sides of an obstruction in the path of the pipeline, such as a river or the like, comprising a first well bore extending downwardly into the ground at an angle from one side of the obstruction into a formation below the obstruction, a second well bore extending downwardly into the ground at an angle from the other side of the obstruction to intersect or be located adjacent the first well bore in the formation below the obstruction, a cavity in the formation common to the two well bores, said cavity being far enough below the surface of the ground for the pressure of the overburden above the cavity to equal or exceed the fluid pressure in the pipeline, first and second strings of casing in the first and second well bores respectively with each casing having its lower end adjacent to and communicating with the cavity and its upper end adjacent the surface, means forming a seal between the outside of each casing string and the well bore in which it is located to prevent fluid in the cavity from flowing between the outside of the well casing and the well bore, and means connecting the upper end of each casing string to one of the pipeline sections to permit fluid to flow from the section of the pipeline on one side of the obstruction to the section on the other side by flowing down the well casing in one well bore, through the cavity to the other well bore, and up the casing therein to the other section of the pipeline.

6. The apparatus of claim 5 in which the means forming a seal between the outside of the casing and the well bore is cement.

7. A method of constructing a pipeline around an obstruction, such as a river, comprising drilling a first well bore from one side of the obstruction into a formation below the obstruction far enough for the overburden to equal or exceed the pressure of the fluid in the pipeline, drilling a second well bore from the other side of the obstruction from the first to intersect the first well bore in the formation, positioning a casing string in each well bore to extend from a point adjacent the end of the well bore to the surface, sealing between the outside of each casing string and the well bore in which it is located, and connecting the well casing to the pipeline on each side of the obstruction to permit the fluid carried by the pipeline to flow down the well casing of one well bore and back to the pipeline through the other well casing.

References Cited

UNITED STATES PATENTS

| 1,883,622 | 10/1932 | Donaldson | 61—42 |
| 3,208,537 | 9/1965 | Scarborough | 175—61 X |
| 3,406,766 | 10/1968 | Henderson | 175—61 |

FOREIGN PATENTS

| 638,505 | 2/1928 | France. |

JACOB SHAPIRO, Primary Examiner

U.S. Cl. X.R.

61—42, 72.7; 175—61